(12) United States Patent
Werschler et al.

(10) Patent No.: US 11,679,693 B2
(45) Date of Patent: Jun. 20, 2023

(54) LINEAR DRIVE, LONGITUDINAL-ADJUSTMENT UNIT FOR A SEAT, AND MOTOR VEHICLE

(71) Applicant: IMS GEAR SE & CO. KGAA, Donaueschingen (DE)

(72) Inventors: Marco Werschler, Radolfszell (DE); Marcel Mittelbach, Schluchsee (DE); Robin Teichmann, Constance (DE); Fabio Mauch, Villingen-Schwenningen (DE)

(73) Assignee: IMS GEAR SE & CO KGAA, Donaueschingen (DE)

( * ) Notice: Subject to any disclaimer, the term of this patent is extended or adjusted under 35 U.S.C. 154(b) by 65 days.

(21) Appl. No.: 17/616,452

(22) PCT Filed: Jun. 4, 2020

(86) PCT No.: PCT/EP2020/065448
§ 371 (c)(1),
(2) Date: Dec. 3, 2021

(87) PCT Pub. No.: WO2020/245252
PCT Pub. Date: Dec. 10, 2020

(65) Prior Publication Data
US 2022/0234478 A1 Jul. 28, 2022

(30) Foreign Application Priority Data

Jun. 4, 2019 (EP) .................................. 19178264

(51) Int. Cl.
*B60N 2/06* (2006.01)
*F16H 37/12* (2006.01)
*F16H 55/08* (2006.01)

(52) U.S. Cl.
CPC ........... *B60N 2/067* (2013.01); *F16H 37/124* (2013.01); *F16H 55/08* (2013.01)

(58) Field of Classification Search
CPC ....... B60N 2/067; F16H 37/124; F16H 55/08; F16H 25/12; F16H 25/18; F16H 19/04; F16H 31/007
(Continued)

(56) References Cited

U.S. PATENT DOCUMENTS 5,477,741 A * 12/1995 Takenaka ................ F16H 25/02
                                                                310/156.08
5,582,068 A * 12/1996 Fukui ..................... F16H 25/02
                                                                29/564
(Continued)

FOREIGN PATENT DOCUMENTS

DE   19932046 A1   1/2001
EP   0612935 A1    8/1994
(Continued)

OTHER PUBLICATIONS

EP Search Report dated Dec. 3, 2019, in corresponding application EP 19178264.8.

*Primary Examiner* — Mark R Wendell
(74) *Attorney, Agent, or Firm* — Nath, Goldberg & Meyer; Jerald L. Meyer (57) ABSTRACT

The present invention relates to a linear drive (1), comprising a drive shaft (10) that can be rotated about a longitudinal axis (X), at least one propulsion element (20) having a propulsion tooth (21), a rack (30), and at least one guide means (40), wherein the at least one propulsion element (20) is coupled to the drive shaft (10) in such a way that the propulsion tooth (21) of said element is pressed into the rack (30) in a cyclical movement (21) during a rotation of the drive shaft (10) about the longitudinal axis (X) to generate an advance, and wherein, when the propulsion tooth (21) of (Continued)

the at least one propulsion element (20) is pressed into the rack (30), the at least one guide means (40) forms an abutment which counteracts the rack (30) for the at least one propulsion element (20). In addition, the present invention relates to a longitudinal adjustment unit and a motor vehicle.

22 Claims, 4 Drawing Sheets

(58) Field of Classification Search
 USPC .................................................. 297/344.1
 See application file for complete search history.

(56) References Cited

U.S. PATENT DOCUMENTS

| 5,823,050 | A | * | 10/1998 | Takenaka | ............... | F16H 25/08 |
| | | | | | | 74/116 |
| 2022/0250511 | A1 | * | 8/2022 | Mittelbach | ............ | F16H 37/124 |

FOREIGN PATENT DOCUMENTS

| EP | 2541098 A1 | 1/2013 |
| WO | 2005/032878 A1 | 4/2005 |
| WO | 2008/028540 A1 | 3/2008 |

\* cited by examiner

LINEAR DRIVE, LONGITUDINAL-ADJUSTMENT UNIT FOR A SEAT, AND MOTOR VEHICLE

This is a National Phase Application filed under 35 U.S.C. 371 as a national stage of PCT/EP2020/065448, filed Jun. 4, 2020, an application claiming the benefit of European Application No. 19178264.8 filed Jun. 4, 2019, the content of each of which is hereby incorporated by reference in its entirety.

The present invention relates to a linear drive having the features of claim 1, to a longitudinal adjustment unit for a seat having the features of claim 21, and to a motor vehicle having the features of claim 22.

Linear drives are known from the prior art in various designs and are commonly used as longitudinal adjustment units for adjusting the position of a seat in motor vehicles. Longitudinal adjustment units typically interact with a lower rail fixed on a chassis and an upper rail arranged within said lower rail, it being possible to drive the upper rail by the longitudinal adjustment unit in a motorized manner and said rail being coupled to the seat. The adjustment of the upper rail by means of the longitudinal adjustment unit is typically carried out in the prior art by means of a spindle which is arranged within the upper rail and is supported in each case at its first end and second end.

Longitudinal adjustment units of this type are known, for example, from DE 36 40 197 A1, DE 42 08 948 C2, DE 196 42 655 C2, DE 198 15 283 A1, DE 10 2004 013 009 A1, and DE 10 2006 052 936 A1.

Due to the high requirements for a linear drive which, in addition to the adjustment function as a longitudinal adjustment unit, must also ensure accident safety, such linear drives have different types of design requiring different production methods and processes. It has been shown that a play-free linear movement can be realized only with great effort and that breaking loads can be adapted only with great effort. In addition to accident safety, new types of interior concepts for motor vehicles also require longer movement distances and higher movement speeds. Increasing the movement speed of linear drives that have proven successful in the past by using a spindle is only possible to a limited extent. Larger movement distances enable new space concepts and, to realize new space concepts, the components involved should not protrude into the space. Rather, it is required that the components involved can be integrated into the base, in particular of a motor vehicle, in order to reduce sources of injury and to be inconspicuous.

This is where the present invention starts.

The object of the invention is to propose an improved linear drive which eliminates in an expedient manner the disadvantages known from the prior art. Furthermore, a linear drive with a particularly compact design is to be specified, which enables an almost play-free linear movement at the same time as a variable and adaptable breaking load. In addition, it is intended to be possible to realize a high adjustment speed using the linear drive according to the invention.

These objects are achieved by a linear drive having the features of claim 1, a longitudinal adjustment unit having the features of claim 21, and a motor vehicle having the features of claim 22.

The linear drive according to the invention having the features of claim 1 comprises a drive shaft that can be rotated about a longitudinal axis, at least one propulsion element having a propulsion tooth, a rack, and at least one guide means, wherein the at least one propulsion element is coupled to the drive shaft in such a way that the propulsion element follows a cyclical movement during a rotation of the drive shaft about the longitudinal axis and the propulsion tooth of said element is pressed into the rack to generate an advance, and wherein, when the at least one propulsion tooth is pressed into the rack, the at least one guide means forms an abutment which counteracts the rack. The guide means absorbs a force or force component resulting from the pressing in of the propulsion tooth of the at least one propulsion element, which acts on the propulsion element transversely to the longitudinal axis.

The invention is based on the concept that the at least one propulsion element follows at least one complete cyclical movement during a complete rotation of the drive shaft about the longitudinal axis and that the propulsion tooth is pressed into and then back out of the rack to generate the propulsion.

When pressed in, the at least one propulsion tooth of the at least one propulsion element is in operative contact with the rack, or can be pressed preferably completely into a tooth space between two teeth of the rack, and in this state can be wedged between the at least one guide means and the rack, the at least one guide means being able to absorb the resulting force or force component in the plane of the rack or in a tangential direction as an abutment, as a result of which no additional transverse forces act on the drive shaft and a high breaking load of the linear drive is ensured.

Furthermore, here and in the following, a cyclical movement is understood to mean a sequence of movements of the at least one propulsion tooth of the at least one propulsion element, in which the at least one propulsion tooth is pressed into the rack once from a starting point and completely exits the rack once and returns to the starting point and vice versa. Each propulsion tooth can go through one or more complete periods or cycles during one rotation of the drive shaft, the number of periods or cycles always being an integer.

When the at least one propulsion tooth enters the rack, the teeth of the rack and the propulsion teeth come into operative contact, resulting in a propulsion in the longitudinal axis. For this purpose, each propulsion tooth enters the rack or the tooth space between two teeth, the propulsion tooth and the tooth of the rack coming into operative contact at so-called friction surfaces, resulting in the propulsion. To this end, it is necessary for at least the teeth and/or the propulsion teeth to have at least one friction surface, preferably two friction surfaces that are formed in the manner of a wedge surface.

According to a development of the present invention, the at least one guide means deflects the movement of the at least one propulsion tooth toward the rack. By means of the at least one guide means, a force acts on the at least one propulsion tooth during the movement or stroke movement, which force causes a deflection in a tangential direction. In this development, the at least one propulsion tooth consequently follows a pivoting movement.

Furthermore, it has proven to be advantageous if the at least one guide means predetermines the movement about an axis of rotation and/or along a motion link or an instantaneous center of rotation. The at least one propulsion tooth can be held so as to be pivotably mounted in the axis of rotation. The motion link can preferably have a guide in the form of a contact surface at which there is operative contact between the at least one guide means and the at least one propulsion tooth. The motion link can guide the movement of the at least one propulsion element into a movement along an axis that does not intersect the longitudinal axis but is oriented tangentially or as a secant. The movement of the at least one propulsion element can also be deflected into a pivoting movement about a fixed axis of rotation or about instantaneous centers of rotation, which, in a preferred development, are arranged along an L-shaped curve, wherein the L-shaped curve corresponds approximately to the course of a spiral and can have an origin in the longitudinal axis. In such an embodiment of the guide means, the movement of the at least one propulsion tooth can first be described as an approximately purely radial movement that is deflected into a tangential direction with increasing stroke.

According to a further embodiment of the present invention, the rack is arranged in a second plane which is parallel to and spaced apart from a first plane which lies in the longitudinal axis. The second plane is consequently arranged in such a way that it does not intersect the longitudinal axis, but is preferably arranged on a tangent of an arbitrary circle which lies in a plane perpendicular to the longitudinal axis and the center of which forms the longitudinal axis. The orientation of the at least one rack in the second plane is such that the teeth of the rack are in the plane, or, in other words, is such that the tooth tips as well as the tooth bases are in the second plane. The pressing in of the propulsion tooth of the at least one propulsion element results in a transverse force or tangential force which can be at least partially, preferably completely, absorbed by the guide means.

Furthermore, it has proven to be advantageous if the at least one propulsion tooth protrudes into a rack housing. The rack housing can be U-shaped and accommodates the rack. According to a preferred embodiment of the present invention, the rack housing can be of modular design, as a result of which the length of the rack housing can be adjusted to be increased as desired by arranging a plurality of rack housing portions in sequence in the longitudinal axis. In particular, it is preferred if a plurality of rack housing portions can be connected to one another in the manner of a plug-in system and/or by connecting means.

Furthermore, it has proven to be advantageous if the at least one propulsion tooth protrudes into an opening in the rack housing, and for the rack to be arranged on a first side in the opening and for the at least one guide means, preferably the motion link, to be arranged on the second, opposite side. When the at least one propulsion tooth enters the opening, the at least one guide means forces a relative movement toward the rack and the at least one propulsion tooth enters the rack. For the resulting transverse forces or radial forces, the motion link forms the abutment. These transverse forces or radial forces thus remain inside the rack housing and no torque acts on the propulsion element. Upon entering the opening in the rack housing, the at least one propulsion tooth is pressed into a form fit between the at least one guide means and the rack.

According to a further preferred embodiment of the present invention, the motion link is wedge-shaped and/or arched, and/or the deflection of the propulsion tooth by the motion link during the stroke movement is linear or non-linear. The design of the motion link allows the movement characteristics of the at least one propulsion tooth in the tangential direction to be significantly influenced, with a wedge-shaped motion link deflecting the at least one propulsion tooth constantly in the tangential direction. In accordance with a preferred embodiment, an arched motion link can be used to bring about a linear as possible movement of the at least one propulsion tooth toward the rack when being pressed into and/or out of the rack.

According to a development of the present invention, the drive shaft comprises a camshaft having at least one camshaft disk, and the camshaft disk is drivingly coupled to the at least propulsion element. The at least one camshaft disk predetermines the cyclical stroke movement of the at least one propulsion tooth, the operational coupling preferably taking place by means of frictional contact between a sliding surface of the camshaft disk and the at least one propulsion tooth. The at least one camshaft disk can, for example, be designed as an eccentric disk or have a shape that is optimized for generating between the two maxima a linear as possible stroke movement of the at least one propulsion tooth toward the rack.

According to a preferred embodiment of the present invention, the recess pierces the propulsion element. Accordingly, the recess extends completely through the propulsion element, it being possible for the recess to be either a clearance hole, a through hole, or an outwardly open groove. The recess preferably forms two side surfaces which are designed to establish a sliding contact with one of the at least one camshaft disk. The recess is preferably arranged in a first end region of the propulsion element, while the at least one propulsion tooth is arranged at the opposite end region.

According to a further preferred embodiment of the present invention, the camshaft penetrates the at least one propulsion element in the recess. In other words, the camshaft is inserted in the longitudinal axis through the recess, the propulsion element preferably being oriented transversely to the longitudinal axis. It is advantageous if the camshaft contacts at least one of the side surfaces of the recess and forms a drive coupling between the camshaft and the at least one propulsion element.

According to a further advantageous embodiment of the present invention, the camshaft disk is designed to be asymmetrical about the longitudinal axis, it being possible for the camshaft disk to further preferably be mirror-symmetrical about a plane of symmetry in the longitudinal axis.

In addition, it has proven to be particularly advantageous if the at least one camshaft disk is designed in such a way that the at least one propulsion tooth is pressed into and out of the rack at a substantially constant speed when the drive shaft rotates about the longitudinal axis at a constant angular velocity. In this context, a substantially constant speed of the at least one propulsion tooth is understood to mean an approximately constant speed between the two turning points or maxima at which the at least one propulsion element is either pressed into the rack or pressed out of the rack. Between the two turning points, preferably more than 80%, preferably more than 90%, of the stroke, the speed should be within a tolerance of ±10%, more preferably ±5%, around an average value. At the turning points, the propulsion element is decelerated accordingly and then accelerated again. Such a movement can be described in an X-Y diagram as a zigzag, the stroke being resolved in the X-axis and the revolution angle being resolved in the Y-axis. In this embodiment, the at least one propulsion tooth is pressed into and out of the rack one single time during a complete rotation (=360°) of the drive shaft in order to generate the advance.

In accordance with a development of the above-described linear drive, it can be advantageous if the drive shaft comprises a crankshaft. The at least one propulsion tooth can be indirectly or directly drivingly coupled to the drive shaft, which is designed as a crankshaft at least in regions, the at least one propulsion tooth preferably being coupled to the drive shaft via a connecting rod. The drive shaft can be a combination between the already described camshaft and the crankshaft.

Furthermore, it has proven to be advantageous if the at least one propulsion element is deflected by the at least one guide means toward the rack in such a way that a movement between the maxima, directed toward the rack, is as constant as possible. In this embodiment, it can be advantageous if the motion link provides an arched guide.

According to a development of the present invention, at least two propulsion elements, each having at least one propulsion tooth, are provided, which are arranged in parallel and spaced apart in the longitudinal axis. A propulsion element is thus assigned to each camshaft disk or connecting rod, with a deflection of each propulsion tooth depending on the angular position of the relevant camshaft disk or the crankshaft.

According to a development of the present invention, it has proven to be advantageous if the movement of the at least two propulsion elements about the longitudinal axis is phase-shifted at an angle. The deflection of each propulsion element during a rotation of the drive shaft is thus time-shifted when the rotational speed of the drive shaft remains constant. Here and in the following, a phase shift is understood to mean an entering and exiting of the at least two propulsion elements into or out of the rack at different angles of rotation of the drive shaft.

The phase shift can be brought about, for example, by an angular offset about the longitudinal axis between the camshaft disks or the crank portions of the crankshaft.

According to an advantageous embodiment of the linear drive according to the invention, the phase shift $\Delta\varphi$ of the cyclical movement of the at least two propulsion elements in relation to a rotation of the drive shaft is at least $1/256$, further preferably at least $1/128$, $1/64$, $1/32$, $1/16$, or $1/8$ and is preferably less than or equal to $1/2$. The phase shift $\Delta\varphi$ is preferably less than $1/2$, in particular $1/3$ or $1/4$ rotations. The phase shift $\Delta\varphi$ between two adjacent propulsion elements can be between $0 \leq \Delta\varphi \leq 1$, preferably $0 \leq \Delta\varphi \leq 1$, in relation to a rotation of the drive shaft. The phase shift $\Delta\varphi$ between at least two adjacent propulsion elements can preferably be $\Delta\varphi=0.2$ or $72°$ or $\Delta\varphi=0.4$ or $144°$. The angle $\alpha$ between the two adjacent camshaft disks can thus also be $72°$ or $144°$.

It may be advantageous if the mathematical reciprocal of the particular fraction ($1/n$) of the phase shift predetermines the minimum number $k$ of propulsion elements to be provided, specifically $k=(n/i)-1$, where a number $i$ is the number of cyclical movements of a propulsion element during one rotation $\varphi$ of the drive shaft. For example, preferably at least 2 propulsion elements are to be provided if the phase shift between the propulsion elements is $1/3\varphi$ and the propulsion element performs one complete cyclical movement per rotation.

According to an advantageous embodiment of the present invention, the at least two propulsion teeth of the at least two propulsion elements are arranged at a first distance in the longitudinal axis and the teeth of the rack are arranged at a second distance along the longitudinal axis, the first distance being smaller than the second distance or the second distance being smaller than the first distance. In other words, the first distances between the propulsion teeth of different propulsion elements and the second distances between the teeth of the rack must be different.

The first distance and the second distance are each based on the geometric center of each propulsion tooth or of each tooth of the rack, or the tooth tip, and are measured in parallel with the longitudinal axis. By virtue of dimensioning the first distance and the second distance differently, the respective propulsion teeth are positioned in different relative positions to the teeth of the rack during a cyclical movement of the at least two propulsion teeth with a phase shift.

It has also proven to be advantageous if each propulsion tooth and/or the tooth of the rack are or is rectangular, triangular, involuted, or sinusoidal. A triangular or sinusoidal tooth shape is preferred. Further preferably, the teeth of the rack and/or the propulsion teeth are arranged equidistantly in parallel with the longitudinal axis. In the event that more than two propulsion teeth are provided, it is also preferred if these propulsion teeth are arranged in parallel with the longitudinal axis in at least one row at equidistant spacings.

It has also proven to be advantageous if each propulsion tooth and/or the teeth of the rack are symmetrical. By designing each propulsion tooth and/or tooth of the rack to be symmetrical, the same adjustment speeds can be achieved in both propulsion directions along the longitudinal axis, provided that the rotational speed of the drive shaft remains constant.

According to a further preferred embodiment of the present invention, each propulsion tooth has a greater, equal, or smaller tooth length and/or a greater tooth depth than the relevant tooth of the rack. By increasing the tooth depth and the tooth length of the teeth of the rack, the contact surface of the propulsion teeth on the tooth flanks or the friction surface on the tooth flanks is increased, as a result of which a more uniform transmission of force can be achieved between the rack and the propulsion teeth. It is also possible for the tooth depth and the tooth length of the propulsion teeth to be greater than the tooth depth and the tooth length of the teeth of the rack, as a result of which a greater overlap can be produced and higher maximum loads can be achieved and the smooth running of the drive device can be improved. Accordingly, by selecting the size ratios between the propulsion teeth and the teeth of the rack, maximum loads and different running characteristics can be set. If the tooth length and the tooth depth of the propulsion teeth are smaller than the tooth length and the tooth depth of the teeth of the rack, more than one propulsion tooth can enter or exit a tooth space between two teeth of the rack at the same time.

Furthermore, it has proven to be advantageous if the at least two propulsion teeth and the teeth of the rack have a corresponding tooth shape. A corresponding tooth shape is to be understood to mean that, upon fully entering the tooth space between two teeth of the rack, each propulsion tooth, together with its friction surface facing the teeth of the rack, can lie flat against at least one of the friction surfaces of the teeth of the rack. In particular, it has proven to be advantageous if each propulsion tooth and the at least one tooth of the rack have an equal tooth flank angle. In this connection, it is noted that the friction surface of the respective tooth flanks does not necessarily have to correspond to a plane, but can also be designed as a curved surface—preferably curved outwardly.

Furthermore, it has proven to be advantageous if the at least two propulsion elements are arranged in a row along an axis parallel to the longitudinal axis. It is also preferred if the rack has a large number of teeth which are arranged in a second row in the second plane and in an axis parallel to the longitudinal axis.

According to a further advantageous embodiment of the present linear drive according to the invention, a carriage is provided in which the at least one propulsion element and the drive shaft are mounted. The at least one propulsion element is preferably held in a plane perpendicular to the longitudinal axis in the manner of a slide bearing, as a result of which the propulsion generated by the at least one propulsion tooth can be transmitted to the carriage. The carriage can be formed of one or more parts and have means by which it is held so as to be linearly movable with respect to the at least one rack or the rack housing. In particular, it is preferred if the carriage is held so as to be supported on the rack housing by suitable means in such a way that it can move easily.

According to a development of the linear drive, a drive is provided. The drive is preferably an electric motor by means of which the drive shaft can be driven.

Furthermore, it is advantageous if a transmission is arranged between the drive and the drive shaft, it being possible for a planetary gearset to be arranged particularly preferably between the drive and the drive shaft.

The drive and/or the transmission can be arranged in the carriage according to an embodiment of the linear drive. The drive in the carriage can be supplied with energy and/or with control signals via a drag chain with corresponding electrical lines.

In addition, the present invention relates to a longitudinal adjustment unit having a linear drive according to the invention.

Another aspect of the present invention relates to a motor vehicle having at least one such linear drive according to the invention.

An exemplary embodiment according to the invention as well as developments of the present invention are described in detail below with reference to the accompanying drawings. In the drawings:

FIG. 8a-d shows simplified and partially sectional representations of a rack housing portion.

Identical or functionally identical components are identified below with the same reference symbols. For the sake of clarity, not all parts that are identical or functionally identical in the individual Figures are provided with a reference number.

Figure 1:
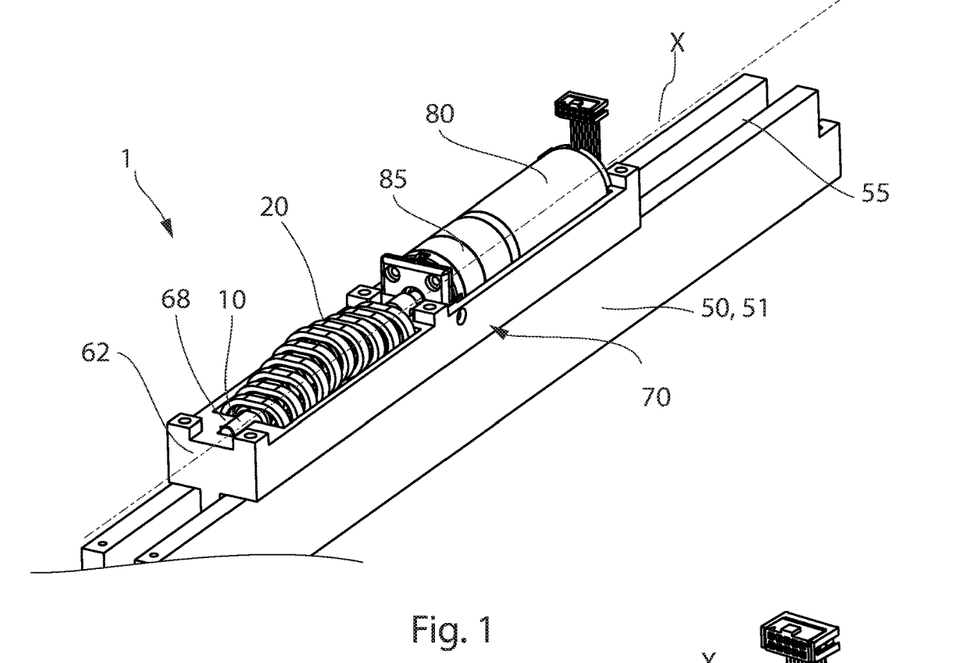
FIG. 1 shows a perspective representation of a linear drive according to the invention, comprising a carriage arranged on a rack housing, the carriage having at least one propulsion tooth which is drivingly coupled to a drive shaft and which, during a rotation of the drive shaft, can be pressed into at least one rack arranged in a recess in a rack housing in a cyclical stroke movement to generate a propulsion.

FIG. 1 shows a simplified perspective view of a linear drive 1 according to the invention, comprising a rack housing 50 and a carriage 70 which is held on or over the rack housing 50 so as to be movably mounted along a longitudinal axis X. The linear drive 1 can be used in a longitudinal adjustment unit (not shown) for adjusting a seat (not shown) in a motor vehicle (not shown), in which the rack housing 50 can be firmly recessed into a vehicle floor and the carriage 70 can be coupled to the seat and/or a row of seats.

The rack housing 50, which is shown in detail in FIGS. 8a-8d, can be a modular system that can be formed from one or more rack housing portions 51, as a result of which the movement distance of the carriage 70 on the rack housing 50 can be configured to be application-specific and theoretically infinitely long.

As in the illustrated exemplary embodiment, the rack housing 50 can be cuboid in shape and have an opening 55 which is designed to be open and thus accessible from the side facing the carriage 70.

Figure 2:
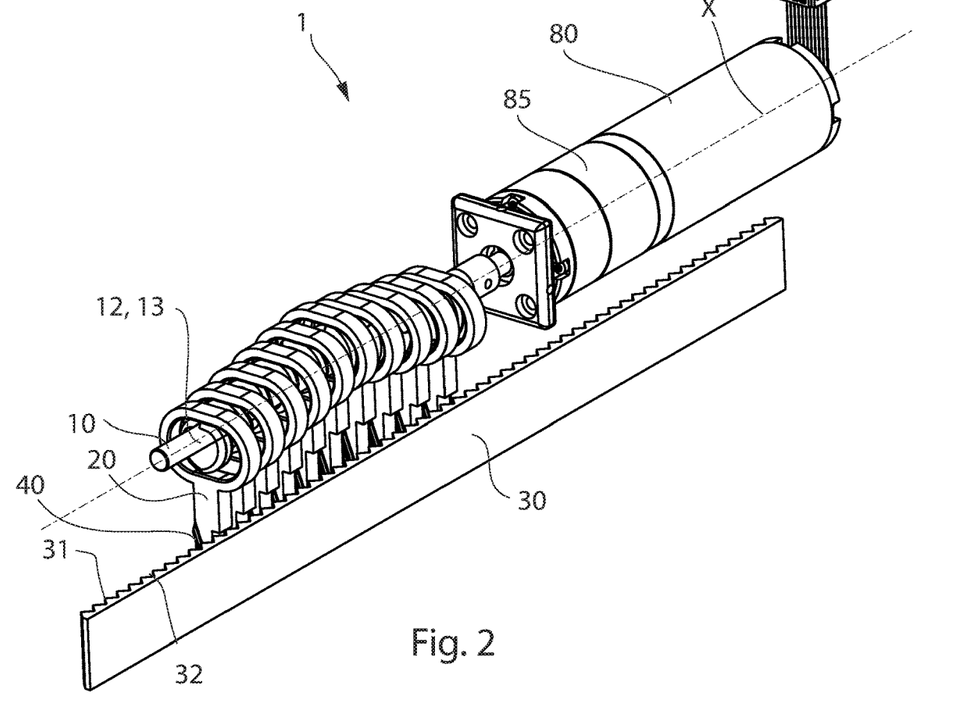
FIG. 2 shows a simplified perspective illustration of the linear drive according to the invention as per FIG. 1.
Figure 3:
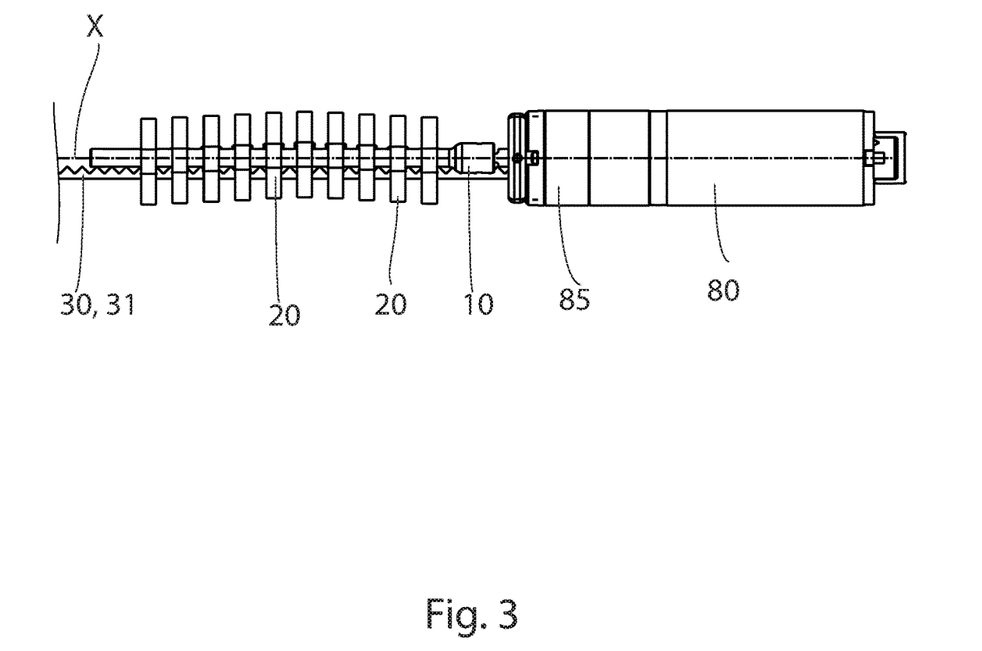
FIG. 3 shows a simplified front view of the linear drive according to FIG. 1, the components in the carriage being visible.

As can be seen in FIG. 2, a rack 30 is arranged in the opening 55, which rack is formed from a large number of teeth 31 that are arranged preferably equidistantly along an axis parallel to the longitudinal axis X. A corresponding tooth space 32 is formed between every two teeth 31.

The rack 30 is arranged within the opening 55 in a second plane E2, which is parallel and spaced apart from a first plane E1, which lies in the longitudinal axis X. The teeth 31 of the rack 30 point toward the second plane E2, according to which both the tooth base and the tooth tip are arranged in the second plane E2.

The rack housing 50 can be designed in such a way that it forms a stop in the longitudinal axis X both in a first end region and in a second end region in the opening 55, by means of which stop the maximum movement distance of the carriage 70 on the rack housing 50 is predetermined.

The teeth 31 of the rack 30 are identical and have a tooth depth H2, a tooth length L2, and a tooth flank angle γ2. The teeth 31 are arranged at a second distance A2, the second distance A2, as shown in FIG. 2, being measured in each case based on the geometric center of the relevant tooth 31. In the case of symmetrical teeth 31, a tooth tip is typically formed in the geometric center, from which two symmetrical tooth flanks extend as friction surfaces 33. In the illustrated exemplary embodiment, the two flanks enclose an angle of approximately 135°, the flanks preferably enclosing an angle of less than or equal to 180° and greater than 30°.

Figure 5:
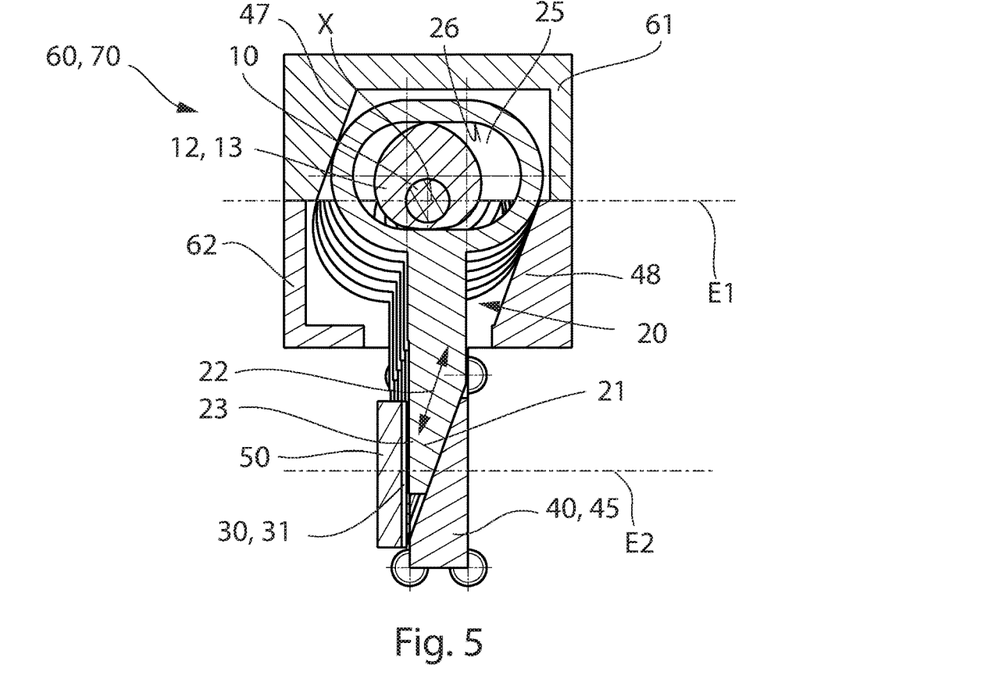
FIG. 5 is a detailed view of the propulsion tooth according to FIGS. 1 to 4, which is coupled to the drive shaft via a camshaft disk.

As shown in FIG. 1 or 5, the carriage 70 comprises a two-part housing 60 formed from a first housing part 61 and a second housing part 62. The housing 60 comprises a first end region and a second end region which can interact with the rack housing 50 as an end stop.

Referring again to FIG. 1, it can be seen that a drive shaft 10 is arranged in the housing 60 of the carriage 70 coaxially with the longitudinal axis X and is held so as to be rotatably mounted in the longitudinal axis X by means of bearings 68. The drive shaft 10 can be coupled to a drive 80 by means of a transmission 85, as a result of which the drive 80 can cause the drive shaft 10 to rotate about the longitudinal axis X.

The drive 80 can preferably be an electric drive and further preferably be coupled to the drive shaft 10 by means of the transmission 85, which is designed as a planetary gearset. The transmission 85 can step up or step down a rotational speed of the drive 80 to a rotational speed of the drive shaft 10.

According to the illustrated exemplary embodiment, the drive shaft 10 can be designed as a camshaft 12 at least in portions and have camshaft disks 13 which are arranged at a distance from one another between the two bearings 68. The camshaft disks 13 are each arranged in a plane transversely to the longitudinal axis X.

The camshaft disks 13 are arranged in a rotated manner along the longitudinal axis X, in each case at an angle α with respect to one another, and, in the present exemplary embodiment, the ten camshaft disks 13 are arranged so as to be rotated about the longitudinal axis X by the angle α=22.5° in each case.

Figure 4:
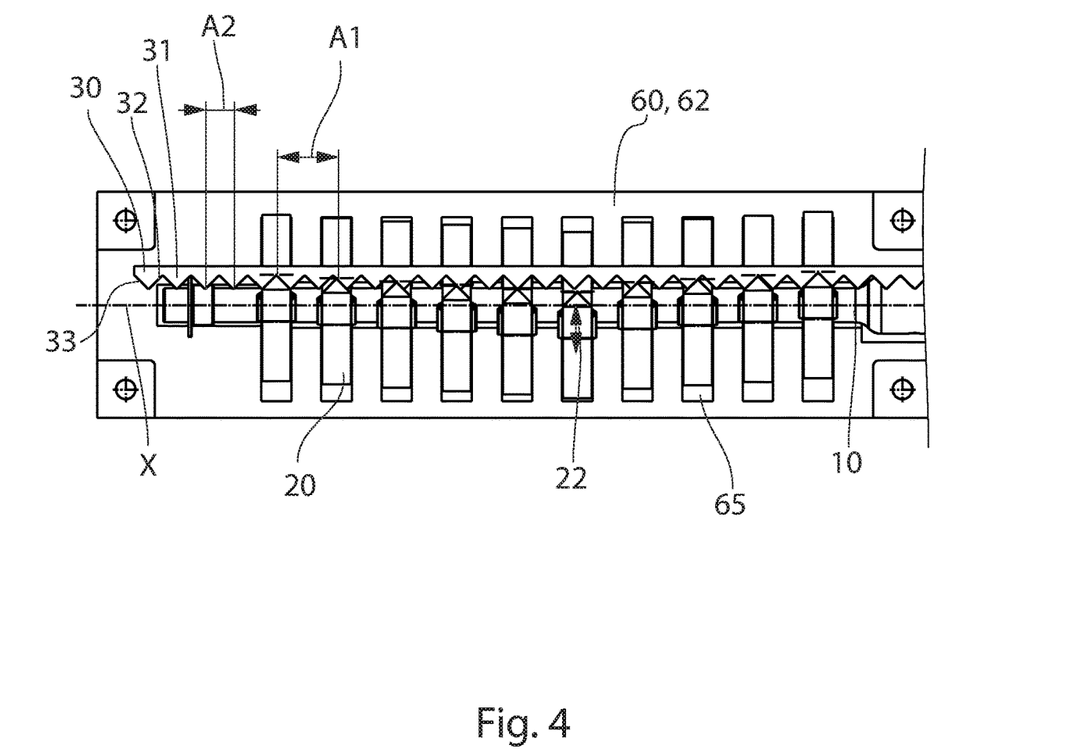
FIG. 4 shows a simplified rear side view of the linear drive according to FIG. 1.

Further in relation to FIG. 4, it can be seen that a plurality of guide recesses 65 are each arranged in the housing 60, which are arranged transversely to the longitudinal axis X in a radial direction with respect to the drive shaft 10 and are directed at the opening 55 in the rack housing 50.

Arranged in each guide recess 65 is a propulsion element 20 having a propulsion tooth 21 which can move in the guide recess 65 and—as indicated by the double arrow—can perform a movement 22 that is distinctive in that the propulsion tooth 21 is pressed into the rack 30 within the opening 55—as will be described later with reference to FIGS. 5, 6, and 7.

With further reference to FIGS. 2, 5, 6, and 7, it can be seen that each propulsion element 20 has a recess 25 which can receive a camshaft disk 13 in each case.

The recess 25 completely pierces the propulsion element 20 in the manner of a through opening or through hole.

The propulsion element 20 is I-shaped with a first end portion and a second end portion, wherein the recess 25 being arranged in the first end portion and a propulsion tooth 21 being arranged in the second end portion. Each propulsion tooth 21 has a depth H1, a tooth length L1, and a tooth flank angle γ1.

Figure 6:
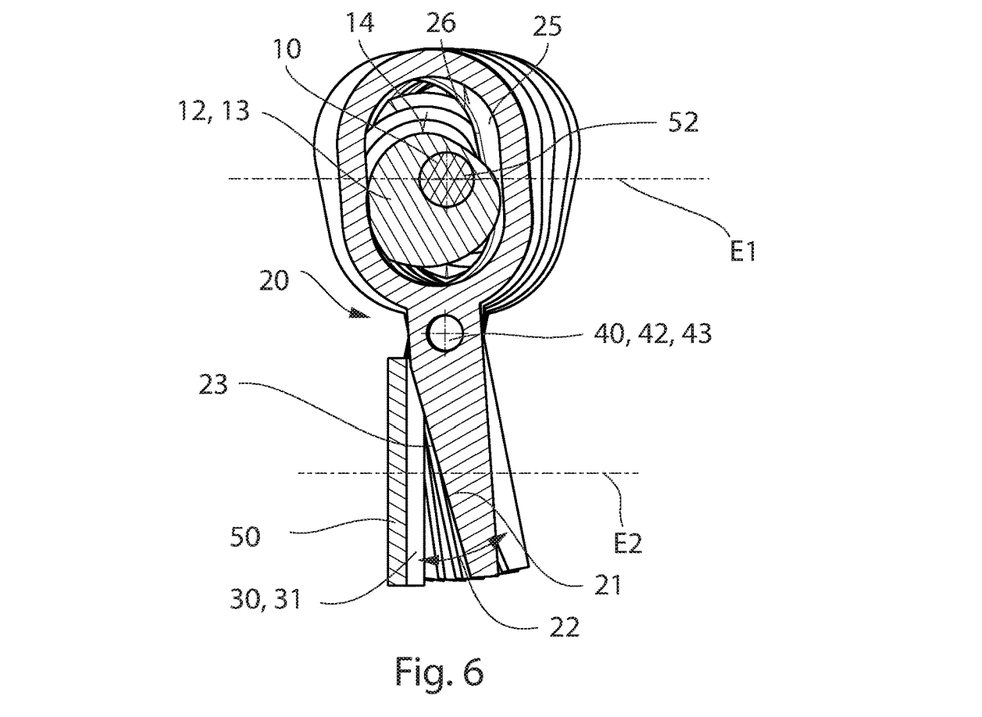
FIG. 6 is a detailed view of a propulsion tooth according to a first development.
Figure 7:
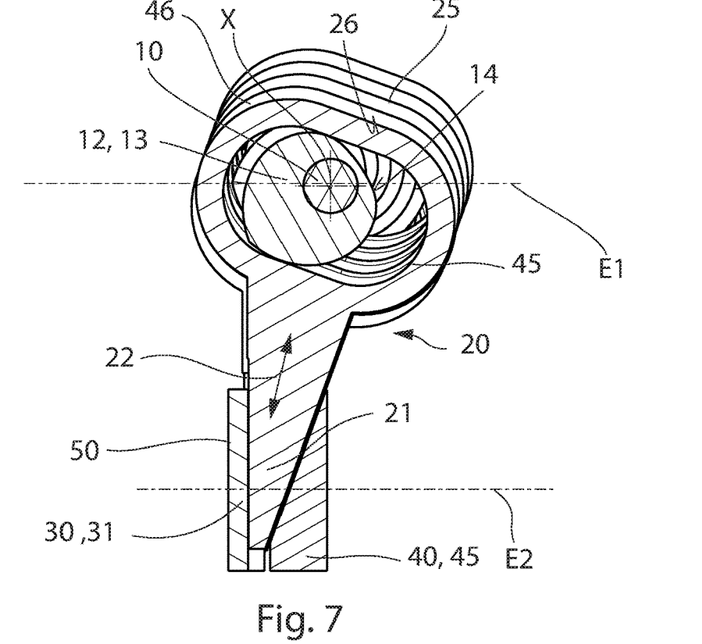
FIG. 7 is a detailed view of a propulsion tooth according to a second development.
Figure 8:
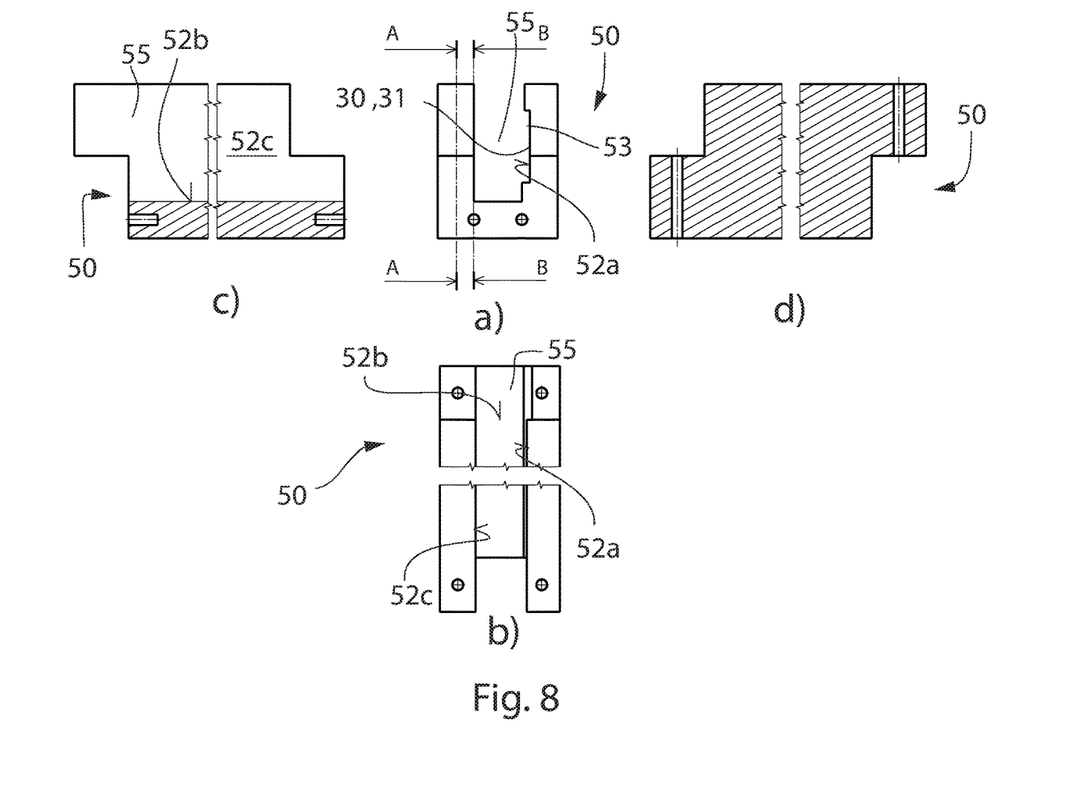

The drive coupling between the camshaft 12 and the propulsion element 20 takes place within the recess 25 by means of operative contact between a friction surface 14 of the camshaft disk 13 and the inner surfaces 26 of the recess 25; this is shown in particular in the sectional representations according to FIGS. 5-7. By means of the coupling between the drive shaft 10 and the relevant propulsion element 20, the propulsion element 20 can be pressed into and back out of the rack 30 without having to provide separate return means for this purpose. For pressing in, a force is applied to the camshaft disk 13 on one of the inner surfaces 26 and, for pressing out, a force is applied to the camshaft disk 13 on the opposite inner surface 26. The propulsion tooth 21 of each propulsion element 20 can, within one cyclical movement, be pressed into the rack 30 or a tooth space 32 once, exit completely, and return to the starting position.

In a row parallel to the longitudinal axis X, ten propulsion teeth 21 are arranged at a distance A1 along the drive shaft 10, the distance A1 being based on the geometric center of the propulsion teeth 21. Accordingly, one camshaft disk can be associated with each propulsion tooth 21.

The guide recess 65 forms an axial bearing for each propulsion element 20, as a result of which the propulsion element 20 is mounted such that it moves easily and can protrude through the guide recess 65 into the opening 55 in the rack housing 50 where, within the opening 55, it can be pressed into and out of one of the tooth spaces 32 of the rack 30.

Each propulsion tooth 21 can preferably be adapted to the shape of the teeth 31 of the rack 30, as a result of which the tooth flanks of the propulsion tooth 21 lie flat against the flanks of the teeth 31 when the propulsion tooth 21 has fully entered the tooth space 32. A tooth length L1 of each propulsion tooth 21 can correspond to the distance A2 between two teeth 31. It is essential, however, that a distance A1 between two propulsion teeth 21 is greater or smaller than the distance A2 between two teeth 31. Thus, A2<A1 or preferably A1>A2. In other words, it must be the case that A1≠A2.

By means of the camshaft disks 13, which are rotated with respect to one another at an angle α about the longitudinal axis X, the cyclical movement of the respective propulsion elements 20 takes place in a phase-shifted manner, as a result of which the propulsion elements 20 are pressed into and out of, or enter and exit, the rack 30 or one of the tooth spaces 32 at different angles of rotation of the drive shaft 10.

The mode of operation of the linear drive 1 is based on the fact that each propulsion element 20 protrudes into the opening 55 and, within the opening 55, can enter the rack 30 in a radial direction guided by a guide means 40. The guide means 40 forms a forced guidance for the relevant propulsion element 20 and acts as an abutment which counteracts the rack 30 and absorbs forces from the at least one propulsion element 20 toward the second plane E2.

When each propulsion tooth 21 enters, a first flank or one of the friction surfaces 23 comes into contact with the flank or the friction surface 33 of one the teeth 31. Due to the wedge-shaped design, the two friction surfaces 23, 33 generate a propulsion which is directed in the longitudinal axis X and which causes the carriage 70 to slide in the space along the longitudinal axis X. As soon as one of the propulsion teeth 21 of the propulsion element 20 has fully entered the rack 30, a further propulsion tooth 21 arranged offset from the center of a further tooth space 32 follows in a phased-shifted manner. The further propulsion tooth 21 of a further propulsion element 20 enters a further tooth space 32 and generates a propulsion. In the meantime, the propulsion tooth 21 which fully entered the tooth space 32 first is pressed out of the tooth space 32 by means of the contacting friction surfaces 23, 33 and the propulsion tooth 21 arranged on the opposite side of the relevant propulsion element 20 is simultaneously pressed into an opposite tooth space 32 of the opposite rack 30. Further propulsion teeth 21 can follow in an offset or simultaneous manner, as a result of which a further propulsion can be generated.

As can be seen from the enlarged representations in FIGS. 5 to 7, the camshaft disk 13 has a particular shape by means of which a movement of the relevant propulsion element 20 can be generated that is as linear and constant as possible. More specifically, the camshaft disk 13 is approximately heart-shaped in the illustrated exemplary embodiment and has a first portion and a second portion, each of which extends over a semicircle. The first portion and the second portion are mirror-symmetrical and have approximately the course of a spiral. The spiral-shaped course of each portion is selected in such a way that the change in radius R, i.e., the distance between the longitudinal axis X and the friction surface 14, changes approximately constantly in a direction of rotation as the revolution angle θ increases, i.e., $\Delta\varphi \approx |\Delta r|$. In the first portion, the radius r therefore increases linearly. In this portion, $\Delta\varphi \approx \Delta r$ applies approximately. In the second portion, the radius r decreases linearly. In this portion, $\Delta\varphi \approx -\Delta r$ applies approximately.

A transition connecting the spiral-shaped courses is formed between the first portion and the second portion in each case. The portions and the transitions are separated symbolically by dash-dotted lines.

The transition is formed in the manner of a transition radius and, in a preferred and illustrated embodiment, can correspond approximately to the width B of the recess 25. In order to avoid wedging or jamming of the camshaft disk 13 in the recess 25, the transitions can be selected in such a way that the distance between the two opposite diametrically formed transitions is at least 90%, preferably more than 95%, of the width B of the recess 25.

Each propulsion element 20 undergoes a complete cycle during a single rotation (φ=360°). In other words, each propulsion element 20 is pressed into and out of the rack 30 a single time during one rotation (φ=360°) of the drive shaft 10 or the camshaft 12. Due to the angular offset between two camshaft disks 13 spaced apart in the longitudinal axis X, the phase shift Δφ based on one rotation (φ=360°) of the longitudinal axis X is $\frac{1}{16}\varphi$. In other words, the camshaft 12 must be rotated by 22.5° so that, after a first propulsion element 20 is pressed in, a second propulsion element 20 enters a further tooth space 32 of the same rack 30. Each second propulsion tooth 21, arranged on the opposite side, is pressed into and out of the rack 30 arranged on the opposite side with a phase shift Δφ of 180°. In a preferred development, the phase shift Δφ between two propulsion elements 20, which are adjacent in the longitudinal axis, can be Δφ≈144°.

FIG. 5 shows that each propulsion element 20 protrudes into the opening 55 in the rack housing 50. The opening 55 is incorporated or molded into the rack housing 50 along the longitudinal axis X in the manner of a longitudinal groove and has two longitudinal sides 52a, 52c and a bottom side 52b. On the longitudinal side 52a, the rack 30 is arranged within an undercut 53 in the second plane E2, and on the opposite longitudinal side 52c the guide means 40, which is in the form of a motion link 45. The motion link 45 is of a wedge-shaped design with a guide surface 46 and, when the propulsion element 20 enters or is pressed into the opening 55, forms an abutment on the side opposite the rack 30 in the opening 55 and forces the propulsion element 20 or the propulsion tooth 21 into the rack 30. When pressed in, the propulsion element 20 slides on the guide surface 46 and is thereby guided accordingly toward the rack 30.

Furthermore, it can be seen in FIG. 5 that further guide means 47, 48 can be arranged in the housing 60, which guide the first end region of the propulsion element 20 within the housing 60. The further guide means 47, 48 can be wedge-shaped like the motion link 45, the guide surfaces being arranged in parallel and spaced apart. The further guide means 47, 48 can be arranged on diametrical sides of the housing 60, according to which the further guide means 47 is arranged in the first housing part 61 and the second further guide means 48 in the second housing part 62.

The further guide means 47, 48 are configured, together with the motion link 45, to guide each propulsion element 20 in a stroke movement along an axis, said axis not intersecting the longitudinal axis X, but rather being oriented tangentially or as a secant thereto. For clarity, the movement or the stroke movement is marked in FIG. 5 with the reference number 22, the movement being directed at an angle of approximately 80° with respect to the first plane E1 and the second plane E2.

The development according to FIG. 6 shows guide means 40 that are in the form of an axis of rotation 42 about which each propulsion element 20 is pivoted in a cyclical movement, which is also marked with the reference number 22.

The axis of rotation 42 can be formed by a correspondingly protruding bearing journal 43 that is formed within the guide recess 65 in the housing 60. When each propulsion element 20 is pressed in, the bearing journal 43 absorbs transverse forces perpendicularly to the longitudinal axis X and thus forms an abutment for the propulsion element 20, which abutment acts on the propulsion element 20, counteracting the rack 30.

A further exemplary embodiment is shown in FIG. 7. In contrast to the exemplary embodiment shown in FIG. 5, no further guide means 47, 48 are provided, which is why the movement of each propulsion element 20 corresponds to a superimposed rotational and stroke movement. The propulsion element 20 is pressed into the rack 30 in a dagger-like manner in the opening 55 by the coupling to the drive shaft 10.

LIST OF REFERENCE NUMERALS

1 Linear drive
10 Drive shaft
12 Camshaft
13 Camshaft disk
14 Friction surface
20 Propulsion element
21 Propulsion tooth
22 Movement
23 Friction surface
25 Recess
26 Inner surface
30 Rack
31 Tooth
32 Tooth space
33 Friction surface
40 Guide means
42 Axis of rotation
43 Bearing journal
45 Motion link
47 Further guide means
48 Further guide means
50 Rack housing
51 Rack housing portion
52a Longitudinal side
52b Bottom side
52c Longitudinal side
53 Undercut
55 Opening
60 Housing
61 First housing part
62 Second housing part
65 Guide recess
68 Bearing
70 Carriage
80 Drive
85 Transmission
A1 First distance between 20 and 21
A2 Second distance between 31
E1 First plane
E2 Second plane
X Longitudinal axis

The invention claimed is:

1. A linear drive (1), comprising
    a drive shaft (10) that can be rotated about a longitudinal axis (X),
    at least one propulsion element (20) having a propulsion tooth (21),
    a rack (30), and
    at least one guide means (40),
    wherein the at least one propulsion element (20) is coupled to the drive shaft (10) in such a way that the propulsion tooth (21) of said element is pressed into the rack (30) in a cyclical movement (22) during a rotation of the drive shaft (10) about the longitudinal axis (X) to generate an advance, and
    wherein, when the propulsion tooth (21) of the at least one propulsion element (20) is pressed into the rack (30), the at least one guide means (40) forms an abutment which counteracts the rack (30) for the at least one propulsion element (20).

2. The linear drive (1) according to claim 1, characterized in that the at least one guide means (40) deflects the movement of the at least one propulsion element (20) toward the rack (30).

3. The linear drive (1) according to claim 1, characterized in that the at least one guide means (40) predetermines the movement about an axis of rotation (42) and/or along a motion link (45).

4. The linear drive (1) according to claim 1, characterized in that the rack (30) is arranged in a second plane (E2) which is parallel to and spaced apart from a first plane (E1) which lies in the longitudinal axis (X).

5. The linear drive (1) according to claim 1, characterized in that the at least one propulsion element (20) protrudes into a rack housing (50).

6. The linear drive (1) according to claim 5, characterized in that the at least one propulsion element (20) protrudes into an opening (55) in the rack housing (50), in that the rack (30) is arranged on a first side (52a), and in that the guide means (40) is arranged on the opposite second side (52c).

7. The linear drive (1) according to claim 1, characterized in that the motion link (45) has a wedge-shaped and/or arched guide surface (46), and/or in that the deflection of the at least one propulsion tooth (21) by the motion link (45) is linear and/or non-linear.

8. The linear drive (1) according to claim 1, characterized in that the drive shaft (10) comprises a camshaft (12) having at least one camshaft disk (13), and in that the camshaft disk (13) is drivingly coupled to the propulsion tooth (20).

9. The linear drive (1) according to claim 1, characterized in that the at least one propulsion element (20) has a recess (25) which surrounds the drive shaft (10), and in that, during a rotation of the drive shaft (10), the at least one propulsion tooth (21) of the at least one propulsion element (20) is pressed into and out of the rack (30) at least once to generate the advance.

10. The linear drive (1) according to claim 1, characterized in that the camshaft disk (13) presses the at least one propulsion tooth (21) into and/or out of the rack (30) between the pressed-in and pressed-out state at a constant speed.

11. The linear drive (1) according to claim 1, characterized in that the drive shaft (10) comprises a crankshaft.

12. The linear drive (1) according to claim 1, characterized in that the at least one propulsion element (20) is coupled to the drive shaft (10) via a connecting rod.

13. The linear drive (1) according to claim 1, characterized in that each propulsion tooth (21) and/or the tooth (31) are designed to correspond and/or are or is symmetrical.

14. The linear drive (1) according to claim 1, characterized in that at least two propulsion elements (20) are provided and in that the at least one propulsion tooth (21) of the at least two propulsion elements (20) is pressed into and/or out of the rack (30) with a phase shift ($\Delta\varphi$).

15. The linear drive (1) according to claim 14, characterized in that, the following applies to the phase shift ($\Delta\varphi$) of the cyclical movement of the at least two propulsion elements (20) in relation to a rotation ($\varphi$) of the drive shaft (10): $1/256\ \varphi \leq \Delta\varphi \leq \frac{1}{2}\varphi$.

16. The linear drive according to claim 14, characterized in that the teeth (31) of the rack (30) are arranged at a first distance (A1) and in that the propulsion teeth (21) are arranged at a second distance (A2), with the first distance (A1) and the second distance (A2) being different, i.e., A1≠A2 applies.

17. The linear drive (1) according to claim 1, characterized in that the at least two propulsion teeth (21) are arranged in a row along an axis parallel to the longitudinal axis (X).

18. The linear drive (1) according to claim 1, characterized in that a carriage (70) is provided, and in that the drive shaft (10) and the at least one propulsion tooth (21) are arranged on the carriage (70).

19. The linear drive (1) according to claim 1, characterized in that a drive (80) is provided, wherein the drive (80) drives the drive shaft (10).

20. The linear drive (1) according to claim 19, characterized in that a transmission (85), in particular a planetary gearset, is arranged between the drive (80) and the drive shaft (10).

21. A longitudinal adjustment unit, having a linear drive (1) according to claim 1.

22. A motor vehicle having a longitudinal adjustment unit according to claim 21.

* * * * *